March 31, 1970     J. INTRAUB     3,503,263
SONIC ALTIMETER
Filed July 30, 1968     3 Sheets-Sheet 1
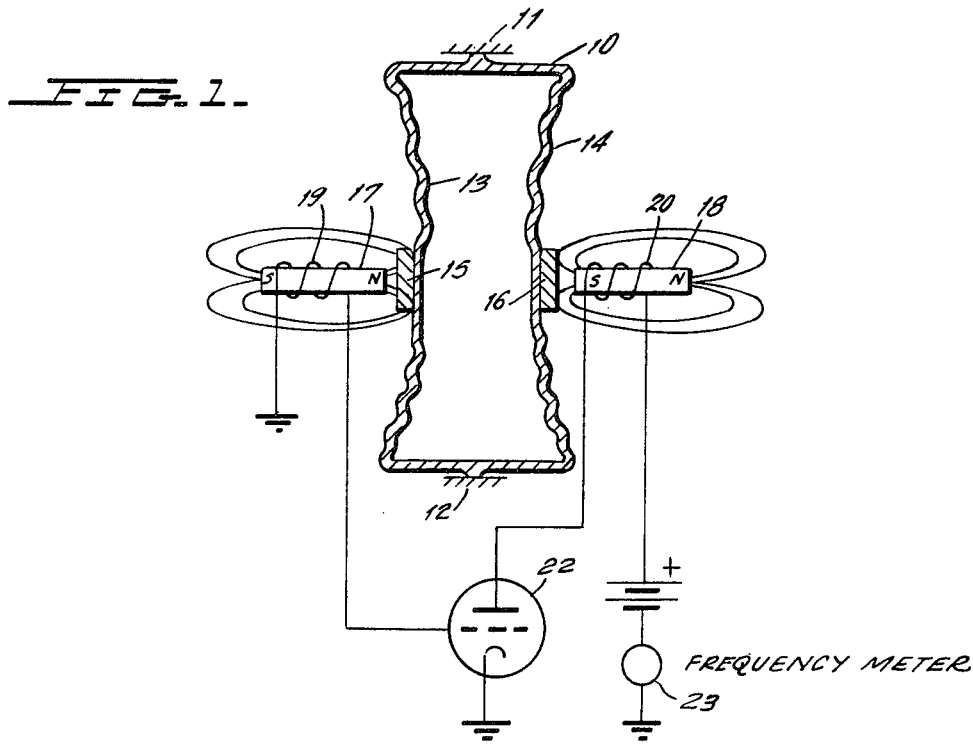
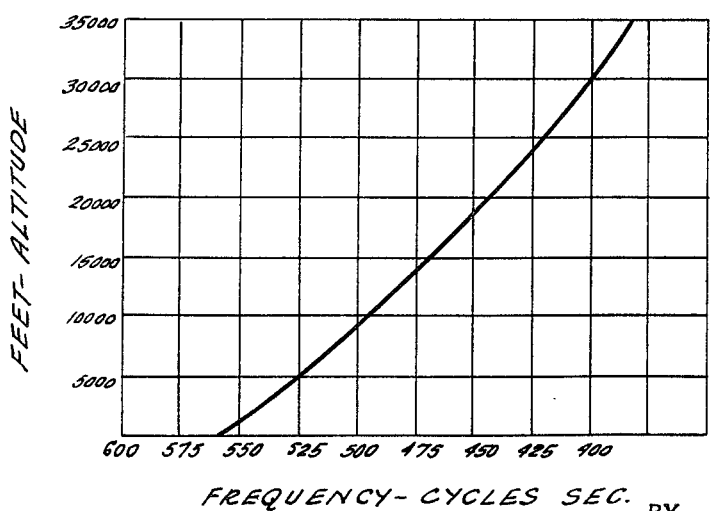
INVENTOR.
JULIUS INTRAUB
BY J. Patrick Cagney
ATTORNEYS March 31, 1970     J. INTRAUB     3,503,263

SONIC ALTIMETER

Filed July 30, 1968     3 Sheets-Sheet 2

INVENTOR.
JULIUS INTRAUB

BY J. Patrick Cagney
ATTORNEYS

March 31, 1970  J. INTRAUB  3,503,263
SONIC ALTIMETER

Filed July 30, 1968  3 Sheets-Sheet 3

INVENTOR
JULIUS INTRAUB

BY J. Patrick Cagney
ATTORNEY

# United States Patent Office 3,503,263
Patented Mar. 31, 1970

3,503,263
SONIC ALTIMETER
Julius Intraub, Plainview, N.Y., assignor to Kollsman Instrument Corporation, Syosset, N.Y., a corporation of New York
Continuation-in-part of application Ser. No. 535,118, Mar. 17, 1966. This application July 30, 1968, Ser. No. 748,685
Int. Cl. G01l 7/12, 9/08
U.S. Cl. 73—386                               12 Claims

ABSTRACT OF THE DISCLOSURE

A pressure measuring system for measuring the differential pressure of an aneroid capsule by vibrating the capsule wall and measuring its natural resonant frequency which is functionally related to the differential pressure.

This application is filed as a continuation-in-part of pending application Ser. No. 535,118, filed on Mar. 17, 1966, now abandoned.

This invention relates to a method and apparatus for determining the extension of an aneroid capsule, and more particularly relates to a novel method for measuring the pressure differential of an aneroid capsule by measuring the resonant oscillating frequency of at least one wall thereof.

Aneroid capsules are well known for the measurement of differential pressures and are commonly used in altimeters, machmeters, and the like. Such aneroid capsules are generally comprised of sealed containers having at least one flexible wall. The interior of the capsule receives a first pressure, while a second pressure is connected to the exterior of the capsule. The degree of extension of the capsule wall will, therefore, determine the differential pressure on the wall.

It has been discovered that a pressure differential in a particular aneroid capsule will not only cause a physical extension of the wall, which is difficult to measure accurately because of the slight amount of movement involved, but will also change the resonant oscillating frequency of the wall.

In accordance with the invention, the pressure differential across the wall is measured by causing the wall to oscillate at its resonant frequency and then measuring this frequency which will be functionally related to the differential pressure.

Thus, the invention comprises, in combination with any type of sealed body having a movable wall, and particularly an aneroid capsule, a driving means for forcing the capsule to expand and contract at its resonant mechanical frequency and a means suitably coupled to the capsule for measuring this resonant frequency.

Clearly, any suitable mechanical driving means could be used which includes magnetic drive means, piezoelectric drive means, or the like, while the measuring means could include any suitable electrical, mechanical or optical pickup that would generate a signal which reflects the oscillating frequency of the capsule.

Accordingly, a primary object of this invention is to provide a simple and reliable means for measurement of pressure.

Another object of this invention is to provide a novel means for measuring differential pressure across a wall of a sealed volume which is independent of the magnitude of extension of the wall.

Yet another object of this invention is to provide a novel means and method for measuring the differential pressure on an aneroid capsule which offers a direct digital readout.

A further object of this invention is to measure the resonant mechanical frequency of an aneroid capsule to determine the differential pressure on the aneroid capsule.

A still further object of this invention is to vary the stiffness of an aneroid capsule by varying the pressure differential on the capsule and measuring the resonant mechanical frequency of the capsule to determine the pressure differential.

Another object of this invention is to provide a differential pressure measuring device which has no moving parts or bearings.

These and other objects of this invention will become apparent from the following description when taken in connection with the drawings, in which:

FIGURE 1 schematically illustrates an arrangement for mechanically oscillating a sealed aneroid capsule at its mechanical resonant frequency, and for measuring this frequency;

FIGURE 3 illustrates the change in mechanical resonant frequency of the capsule of FIGURE 2 for a change in differential pressure on the capsule.

Figure 2:
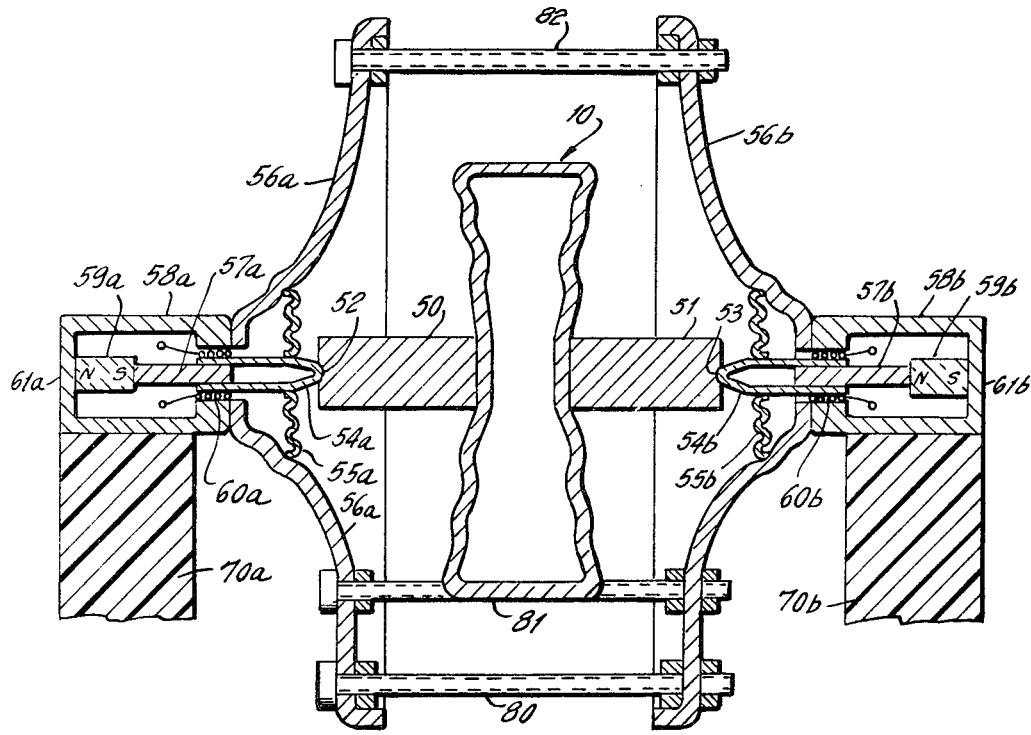
FIGURE 2 shows a second embodiment of the invention for the mechanical drive means for the aneroid capsule.

Referring first to FIGURE 1, I have illustrated, in cross-section, a sealed aneroid capsule 10 of the standard type which is completely evacuated for use as an altimeter device or for the measurement of external pressure. Note, however, that other pressures can be injected into the interior of aneroid capsule 10 so that the system would generally measure the differential pressure of the interior pressure as against the exterior pressure of the capsule.

Note further that in the following description, a bellows wall type of diaphragm is used for the capsule, although it will be apparent that any oscillatable wall of a sealed chamber would come within the scope of the present invention.

In accordance with the embodiment of the invention shown in FIGURE 1, the aneroid capsule 10 is suitably supported at its rim by suitable fixed supports 11 and 12. Preferably, the rim support is resiliently connected to the diaphragm since a rigid support structure has been found to inhibit the diaphragm oscillation at its fundamental frequency. Thus, supports 11 and 12 are preferably of rubber, or some other suitable flexible mounting can be used.

The central portions of the opposing flexible walls 13 and 14 then have ferromagnetic disks 15 and 16 secured thereto and in proximity to the ends of permanent magnet cores 17 and 18, respectively. Each of magnet cores 17 and 18 then receive coils 19 and 20, respectively, which are the coils of the oscillating circuit including a plate voltage source 21, and amplifier tube 22.

The left-hand end of winding 19 is connected to ground, while the right-hand end of coil 19 is connected to the grid of tube 22. The left-hand end of coil 20 is then connected to the plate of tube 22 which has a grounded cathode. The right-hand end of coil 20 is then connected to battery 21, as shown.

It will be noted that the windings 19 and 20 are phased to produce a positive feedback for the circuit so that the circuit will oscillate at a frequency determined by the natural frequency of oscillation of magnetic disks 15 and 16 and thus the bellows walls 13 and 14 in the magnetic fields generated in cores 17 and 18.

A standard frequency meter 23 may then be connected directly in series with plate supply 21, thereby to measure the oscillating frequency of the oscillating circuit and thus the natural resonant frequency of walls 13 and 14. This resonant frequency is, in turn, related to the stiffness of the walls of the aneroid capsule 10 which is, in turn, directly related to the pressure differential thereacross.

When the circuit of FIGURE 1 is used in an altimeter, the stiffness of the walls will vary as a function of differential pressure in a ratio of approximately 20 to 1 over an altitude range of approximately 80,000 feet. Therefore, the altitude can be accurately measured in the 80,000 foot range by measuring the natural mechanical frequency of oscillation of the capsule walls. Moreover, an altimeter constructed in this manner will require no moving parts or bearings which are commonly required in most commercial altimeters at the present time and are a source of most failures in altimeters.

FIGURE 2 illustrates a second embodiment of the invention wherein the structure for inducing the oscillation of the walls of an aneroid capsule is formed of standard available voice coils commonly used for radio purposes.

More particularly, in FIGURE 2, the aneroid capsule 10 is provided with centrally located non-magnetic disks or pads 50 and 51 which have indentations 52 and 53 therein for receiving lightweight cones 54a and 54b, respectively, which are connected to the flexible walls 55a and 55b respectively, which are carried within the voice coil supports 56a and 56b, respectively.

The voice coil magnet structures include cylindrical bodies 58a and 58b which have permanent magnets 59a and 59b secured to and extending from the bases thereof. Rods 57a and 57b which are of magnetic material then extend from the permanent magnets 59a and 59b, as shown, with assemblies 57a, 58a, 59a and 57b, 58b and 59b defining respective integral structures.

Lightweight cones 54a and 55b are then slidably received by the free ends of rods 57a and 57b, respectively, and carry voice coils 60a and 60b, respectively, in the annular air gap between the free end of rods 57a and 57b and the cylindrical bodies 58a and 58b, respectively. Coils 60a and 60b have suitable output terminals (not shown) which are connected to suitable amplifier means (not shown) which are subsequently connected in a self-oscillating circuit similar to that of FIGURE 1. In operation, the voice coils oscillate across the magnetic field due to permanent magnets 59a and 59b in the annular space between rods 57a and 57b and the surrounding magnetic structures 58a and 58b. Thus, an output signal at the terminals of coils 60a and 60b will reflect the frequency of oscillation of diaphragm 10.

In order to support the assemblage of FIGURE 2, the entire assemblage was supported on two blocks 70a and 70b which were secured to the cylindrical magnetic members 58a and 58b. The spacing between the probes 54a and 54b was then accurately controlled by connecting the supports 56a and 56b to one another through three connecting screws 80, 81 and 82 which securely connected supports 56a and 56b together with the aneroid 10 floating between the two points of securement at the center thereof through cones 54a and 54b.

A typical test of the operation of the structure of FIGURE 2 is described in FIGURE 3 wherein the natural resonant frequency of aneroid 10 was measured as the external pressure on aneroid 10 was reduced from an altitude of zero feet to an altitude of approximately 35,000 feet. As will be seen in FIGURE 3, the frequencies vary from approximately 562 cycles per second to approximately 424 cycles per second over this altitude range.

It will be apparent that the structures of FIGURES 1 and 2 could use modified magnetic circuits and modified transducer means. For example, a resiliently mounted diaphragm could drive piezoelectric ceramic cylinders mounted at the center of the oscillation diaphragm, whereby output signals are generated from the piezoelectric members which have the frequency of the oscillating frequency of the diaphragm. Note that in this type arrangement, the piezoelectric members are unsupported at their opposite ends with their inertial mass opposing the expansion and contraction of the diaphragm.

Figure 4:
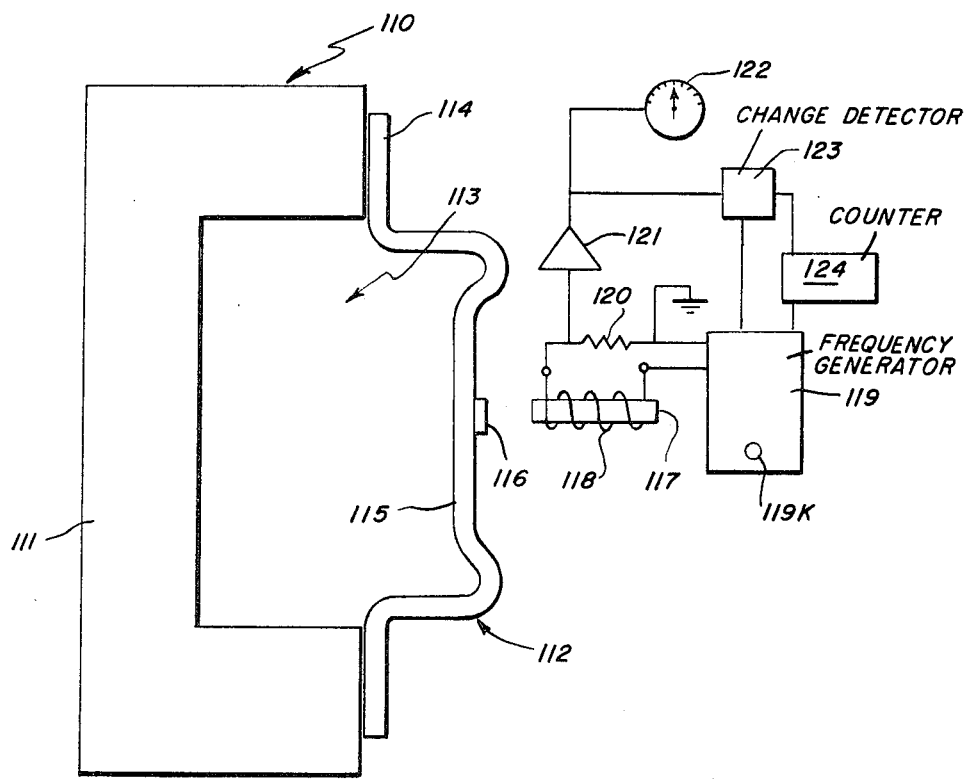
FIGURE 4 schematically illustrates another embodiment utilizing a sealed capsule having a single movable wall of a substantially planar form and driven from an oscilator.

In the arrangements shown in FIGURES 1 and 2, a standard sealed aneroid capsule construction such as is used in altimeters (e.g. see U.S. Patent No. 1,930,899), is used because of the proven reliability and uniformity of such devices, however, the sealed housing may take other forms. In the embodiment of FIGURE 4, a sealed housing 110 includes a rigid cup-shaped main body 111 and a diaphragm 112 sealed across the open end of the main body to define an enclosed chamber 113. The diaphragm has a peripheral flange portion 114 secured to the body by weld, solder or other suitable means and a resiliently flexible central wall portion 115 to undergo a resiliently flexible movement in accordance with the characteristic spring constant. It may be noted that the wall portion 115 is substantially flat as compared with the bellows shape of the diaphragm walls 13, 14 shown in FIGURE 1 but essentially the same relationship between spring constant and differential pressure exists in both instances.

With the capsule arrangement shown in FIGURE 4, no resilient mount is shown as the rigid body 111 can be mounted on any suitable support. A driving means is shown for vibrating the flexible wall 115 to expand and contract the chamber 113. In the embodiment illustrated in FIGURE 4, an external pressure to be measured acts upon the outer face of the diaphragm and the pressure within chamber 113 acts upon the inner face of the diaphragm. As in the case of the standard aneroid the chamber 113 may be substantially evacuated or it may be set to any desired internal pressure, which may exceed the external pressure, consistent with the range of external pressure that is to be measured. In any case, the pressure relationships are such that a differential pressure acts across the central wall portion 115. The value of the differential pressure acting on the wall 115 varies as the external pressure varies. In accordance with the present invention, an accurate measurement of pressure is correlated with the variation of the spring constant exhibited by the wall 115 with variations in differential pressure.

In the case of pressure-responsive altimeters, where measurements of air pressure are to be made at various altitudes, it should be noted that the change in pressure as a function of altitude is highly non-linear and varies by a ratio of about 20:1 between sea level and 80,000 feet. It should be noted that, as in the case of the standard aneroid shown in FIGURES 1 and 2, the flat wall 115 in the embodiment of FIGURE 4 has a wall stiffness or spring constant factor that varies in an inverse fashion but in a ratio of about 20 to 1 when it is subjected to a corresponding range of differential pressures.

The natural frequency of vibration for any mechanical element is given as $$f_n = \frac{1}{2\pi}\sqrt{\frac{K}{m}}$$

where K is the spring constant and m is the effective mass. Since the effective mass of the vibratable wall in any of the disclosed embodiments is small and since a 20:1 ratio in the value of the spring constant K is achieved with altitude, a large frequency change is obtained with altitude. This frequency change is determined primarily by the change in the spring constant K as there is little effect due to change in the effective mass and/or due to damping of the ambient medium. In fact, the change in spring constant is so related to the change in altitude, that a substantial linearization of the frequency change with altitude is achieved so that substantially constant sensitivity is obtained over the entire altitude range.

Whereas in FIGURES 1 and 2 the driving means for mechanically vibrating the diaphragm walls was incorporated in a self-oscillating circuit wherein the capsule served as a frequency determining feed-back element, the embodiment of FIGURE 4 utilizes a driving means which is variable over a range of frequency and has means for indicating the particular resonant frequency for the diaphragm.

In the embodiment of FIGURE 4, a ferro-magnetic disk 116, preferably of low mass, is disposed centrally on the wall 115 in proximity to one end of the core 117 of an electromagnet which has a drive coil 118 connected to a frequency generator 119 which includes means for sweeping a desired range of frequencies. A resistor 120 is connected in one of the supply lines to the coil 118 to produce a characteristic signal change when the applied frequency is at the resonant frequency point of the wall 115. The signal change is fed through an amplifier 121 to actuate a change detector 123 which is connected to a counter 124 to produce a digital readout of frequency from the generator 119.

For manual operation, the frequency generator 119 is provided with a manual tuning knob 119K and an indicating meter 122 is connected to the amplifier to provide a visual check of the resonant frequency value as the generator is swept through a range of frequencies.

Thus while preferred constructional features of the invention are embodied in the structure illustrated herein, it is to be understood that changes and variations may be made by those skilled in the art.

The embodiments of the invention in which an exclusive privilege or property is claimed are defined as follows:

1. A pressure measuring system comprising a sealing housing enclosing a predetermined volume and having a flexible wall, means connecting a differential pressure across said wall, oscillating means connected to said wall for oscillating said wall with vibratory motion at the natural resonant frequency of said wall, and frequency measuring means connected to said oscillating means for measuring the frequency of oscillation of said wall, and mounting means for mounting said sealing housing, and resilient connecting means connecting said sealing housing to said mounting means.

2. The pressure measuring system of claim 1 wherein said healing housing comprises an aneroid capsule, said aneroid capsule having a rim, said resilient connecting means connected to said rim.

3. A pressure measuring system comprising a sealing housing enclosing a predetermined volume and having a flexible wall, said flexible wall being flexible without imposing strain to the remainder of said sealing housing, means connecting a differential pressure across said wall, oscillating means connected to said wall for oscillating said wall with vibratory motion at the natural resonant frequency of said wall, and frequency measuring means connected to said oscillating means for measuring the frequency of oscillation of said wall, said sealing housing comprising an aneroid capsule, said flexible wall comprising a corrugated wall of said capsule.

4. The pressure measuring system substantially as set forth in claim 3 wherein said oscillating means includes magnetic means connected to said wall, and positive feed-back circuit means magnetically coupled to said magnetic means for generating an alternating magnetic field at the natural frequency of oscillation of said magnetic means connected to said wall.

5. In a system for measuring pressure, a sealed housing defining an enclosed chamber, said housing having a resiliently flexible wall portion bounding said chamber and exposed to the pressure to be measured, said wall portion having a configuration for which the characteristic spring constant varies in a predetermined relation in accordance with its position due to the differential of pressure acting across said wall portion, driving means for mechanically vibrating said wall portion to establish oscillation thereof at a resonant frequency determined by said spring constant, and means for producing a signal representative of the resonant frequency of oscillation of said wall portion, said housing being an aneroid capsule in which the spring constant varies over a range of about 20 to 1 where the pressure to be measured ranges between atmospheric pressure at sea level and atmospheric pressure at 80,000 feet above sea level.

6. In a system in accordance with claim 5 and including resilient mounting means for mounting said aneroid capsule, said aneroid capsule having a rim and said resilient mounting means being connected to said rim.

7. In a system for measuring pressure, pressure responsive means having a central wall portion exposed to differential gas pressure on its opposite faces, said pressure responsive means including flexible wall structure bounding and carrying said central wall portion for causing the central wall portion, in the presence of differential gas pressure, to assume a configuration free of substantial bodily stretching and uniquely determined by the differential pressure acting thereon and for allowing such configuration to determine the characteristic spring constant for substantially hysteresis-free mechanical vibration of the central wall portion, driving means for mechanically vibrating said central wall portion to establish oscillation thereof at a resonant frequency determined by the characteristic spring constant corresponding to such configuration, and means for producing a signal representative of the resonant frequency.

8. In a system in accordance with claim 7 and wherein said pressure responsive means comprises an aneroid capsule having a rim, and resilient mounting means connected to said rim for mounting said capsule.

9. In a system in accordance with claim 7 wherein said pressure responsive means comprises an aneroid capsule in which the spring constant varies over a range of about 20 to 1 where the pressure to be measured ranges between atmospheric pressure at sea level and atmospheric pressure at 80,000 feet above sea level.

10. In a system for measuring pressure, a diaphragm, means mounting said diaphragm for exposure to differential gas pressure on its opposite faces, said diaphragm having a flexible circumambient bend portion in angular relation to and integrally carrying a resiliently flexible central wall portion for causing the central wall portion in the presence of said differential gas pressure to assume a configuration free of substantial bodily stretching and uniquely determined by the differential pressure acting thereon and for allowing such configuration to determine the characteristic spring constant for substantially hysteresis-free mechanical vibration of the central wall portion, driving means for mechanically vibrating said central wall portion to establish oscillation thereof at a resonant frequency determined by the characteristic spring constant corresponding to such configuration, and means for producing a signal representative of the resonant frequency.

11. In a system in accordance with claim 10 wherein said means mounting said diaphragm includes resilient means peripherally connected to said diaphragm.

12. In a system in accordance with claim 10 wherein the spring constant varies over a range of about 20 to 1 where the pressure to be measured ranges between atmospheric pressure at sea level and atmospheric at 80,000 feet above sea level.

References Cited

UNITED STATES PATENTS

| 2,466,809 | 4/1949 | Hobbs | 73—398 |
| 3,021,711 | 2/1962 | Arvidson | 73—398 |
| 3,327,533 | 6/1967 | Kooiman | 73—398 |

FOREIGN PATENTS 982,930   2/1965   Great Britain.

LOUIS R. PRINCE, Primary Examiner

DENIS E. CORR, Assistant Examiner

U.S. Cl. X.R.

73—398, 406, 410